United States Patent [19]

Nakamura et al.

[11] Patent Number: 5,564,309
[45] Date of Patent: Oct. 15, 1996

[54] RECTILINEAR MOTION APPARATUS

[75] Inventors: Haruji Nakamura, Takatsuki; Yoshiyuki Kubota, Katano; Hideto Machida; Toshiyuki Okada, both of Moriguchi; Hiroyuki Mochizuki, Osaka; Seiichi Sawada, Katano, all of Japan

[73] Assignee: Matsushita Electric Industrial Co., Ltd., Osaka-fu, Japan

[21] Appl. No.: 288,612

[22] Filed: Aug. 10, 1994

Related U.S. Application Data

[63] Continuation-in-part of Ser. No. 159,524, Dec. 1, 1993, abandoned.

[30] Foreign Application Priority Data

| Dec. 2, 1992 | [JP] | Japan | 4-322989 |
| Aug. 13, 1993 | [JP] | Japan | 5-200916 |
| Mar. 15, 1994 | [JP] | Japan | 6-044048 |

[51] Int. Cl.$^6$ .................................................. F16H 19/06
[52] U.S. Cl. ................................... 74/89.21; 74/89.22
[58] Field of Search ........................ 74/89.2, 89.21, 74/89.22; 474/140

[56] References Cited

U.S. PATENT DOCUMENTS

| 3,273,408 | 9/1966 | Nagel et al. | 74/22 |
| 3,388,604 | 6/1968 | McFarland et al. | 74/89.22 |
| 4,231,215 | 11/1980 | Klas | 56/11.6 |
| 4,804,285 | 2/1989 | Bradford | 74/89.22 X |
| 5,254,046 | 10/1993 | Hohnl | 474/101 |

FOREIGN PATENT DOCUMENTS

| 3511468 | 10/1986 | Germany . |
| 61-140665 | 6/1986 | Japan . |
| 2-106283 | 4/1990 | Japan . |
| 3-199603 | 8/1991 | Japan | 474/140 |

OTHER PUBLICATIONS

"Differential gears drive low cost motions", Innovator's Notebook, Eureka, vol. 10, No. 6, Jun. 1990.

*Primary Examiner*—Allan D. Herrmann
*Attorney, Agent, or Firm*—Wenderoth, Lind & Ponack

[57] ABSTRACT

A rectilinear motion apparatus includes two shafts arranged in parallel, a driving motor and a driving pulley coupled to one of the two shafts, an idler pulley coupled to the other of the two shafts, an endless toothed belt arranged between the driving pulley and idler pulley, and a slider disposed between the driving pulley and the idler pulley. The slider includes a first moving pulley and a second moving pulley of a diameter larger than a diameter of the first moving pulley. The first and second moving pulleys are integrally fixed to one another for rotation about the same axis so as to rotate simultaneously. A first pair of guide rollers are disposed on the slider adjacent the first moving pulley to guide a lower run of the toothed belt, and a second pair of guide rollers are disposed on the slider adjacent the second moving pulley to guide an upper run of the toothed belt. Regulating devices are provided for regulating shifting of the toothed belt in a disengaging direction of the toothed belt away from the first and second moving pulleys. Each regulating device is arranged on the slider and in a vicinity of an engaging part where the toothed belt is meshed with one of the first and second moving pulleys.

18 Claims, 10 Drawing Sheets

RECTILINEAR MOTION APPARATUS

This is a Continuation-In-Part of U.S. Ser. No. 08/159,524 filed Dec. 1, 1993 now abandoned.

BACKGROUND OF THE INVENTION

The present invention relates to a rectilinear motion apparatus for use in industrial robots or the like.

A conventional rectilinear moving apparatus will be described hereinbelow.

FIG. 11 indicates the basic structure of a conventional rectilinear moving apparatus disclosed in Japanese Laid-open Patent Publication No. 2-106283. In FIG. 11, a driving pulley 13 having the radius (r) is coupled to a driving motor 11 via a shaft 12a. A shaft 12b is set parallel to the shaft 12a and coupled with an idler pulley 14. An endless belt 15 connects the driving pulley 13 with the idler pulley 14. A slider 17 is arranged so as to be kept in contact with the endless belt 15 between the driving pulley 13 and the idler pulley 14.

The operation of the above-described conventional rectilinear moving apparatus will be explained now.

When the driving pulley 13 is rotated by an angle θ by the driving motor 11, the endless belt 15 is moved the distance rθ, and the slider 17 alike is moved the same distance rθ. Therefore, the moving amount of the endless belt 15 by the rotation of the driving pulley 13 is equal to the moving amount of the slider 17 in the horizontal direction in the prior art arrangement.

If it is desired to decelerate the apparatus so as to augment the thrust and to improve the accuracy, conventionally, the apparatus disclosed in Japanese Laid-open Patent Publication No. 61-140665 is designed in such constitution as illustrated in FIG. 12. In FIG. 12, the shafts 12a, 12b are arranged parallel to each other, the former 12a coupling the driving motor 11 with the driving pulley 13, while the latter 12b is coupled to the idler pulley 14. The driving pulley 13 and the idler pulley 14 are connected with each other by the endless belt 15. There are provided two rotatable pulleys 20a, 20b and two pairs of guide rollers 18a, 18b and 18c, 18d in a slider 19 arranged between the pulleys 13 and 14. The lower run of the endless belt 15 is sent along the pulley 20a by the guide rollers 18a, 18b. On the other hand, the upper run of the endless belt 15 is retained by the guide rollers 18c, 18d to trace the pulley 20b. A pulley 21c is coupled with the pulley 20a by a shaft 22c, and is further coupled via an endless belt 23 with a pulley 21d connected with the pulley 20b by a shaft 22d. The pulley 21d has a smaller diameter than the pulley 21c.

The operation of the rectilinear moving apparatus of FIG. 12 will be described below.

When the driving motor 11 is driven, the driving pulley 13 is rotated, thereby rotating the idler pulley 14 and the pulleys 20a, 20b connected by the endless belt 15. Although the pulleys 21c, 21d coaxially provided with the pulleys 20a, 20b are rotated at this time, the pulley 20b coaxial with the pulley 21d assumes a larger rotating angle than the pulley 20a coaxial with the pulley 21c because the pulley 21d is smaller in diameter than the pulley 21c. Since the moving amount of the endless belt 15 is varied due to the difference of the rotating angles of the pulleys 20a, 20b, the slider 19 is moved half the difference of the moving amount. That is, the moving amount of the endless belt 15 subsequent to the rotation of the driving pulley 13 becomes half the difference of the diameter of the pulleys 21c and 21d.

Due to the number of pulleys present in the prior art as described above, the conventional apparatuses are disadvantageously complicated in structure and expensive, and the total loss of movement is large because of the backlash between each pulley and belt or the slack of the belts.

SUMMARY OF THE INVENTION

The object of the present invention is therefore to provide an inexpensive rectilinear motion apparatus simplified in structure and which realizes a high reduction gear ratio, augments the thrust, improves the positional accuracy, and reduces the loss of movement due to the missing of engagement between a toothed belt and moving pulleys.

In accomplishing these and other objects, according to one aspect of the present invention, there is provided a rectilinear motion apparatus comprising:

two shafts arranged in parallel and mounted to a fixed plate;

a driving motor and a driving pulley coupled to one of the two shafts;

an idler pulley coupled to the other of the two shafts;

an endless toothed belt arranged between the driving pulley and idler pulley;

a slider disposed between the driving pulley and the idler pulley;

a first moving pulley and a second moving pulley of a diameter larger than a diameter of the first moving pulley, the first and second moving pulleys being integrally fixed to one another and rotatable about the same axis to rotate simultaneously;

a first pair of guide rollers disposed on the slider adjacent the first moving pulley along a first run of the toothed belt;

a second pair of guide rollers disposed on the slider adjacent the second moving pulley along a second run of the toothed belt; and regulating devices for regulating shifting of the toothed belt in a disengaging direction of the toothed belt away from the first and second moving pulleys, each regulating device being arranged on the slider and in the vicinity of a part of the toothed belt which is engaged and meshed with one of the first and second moving pulleys.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
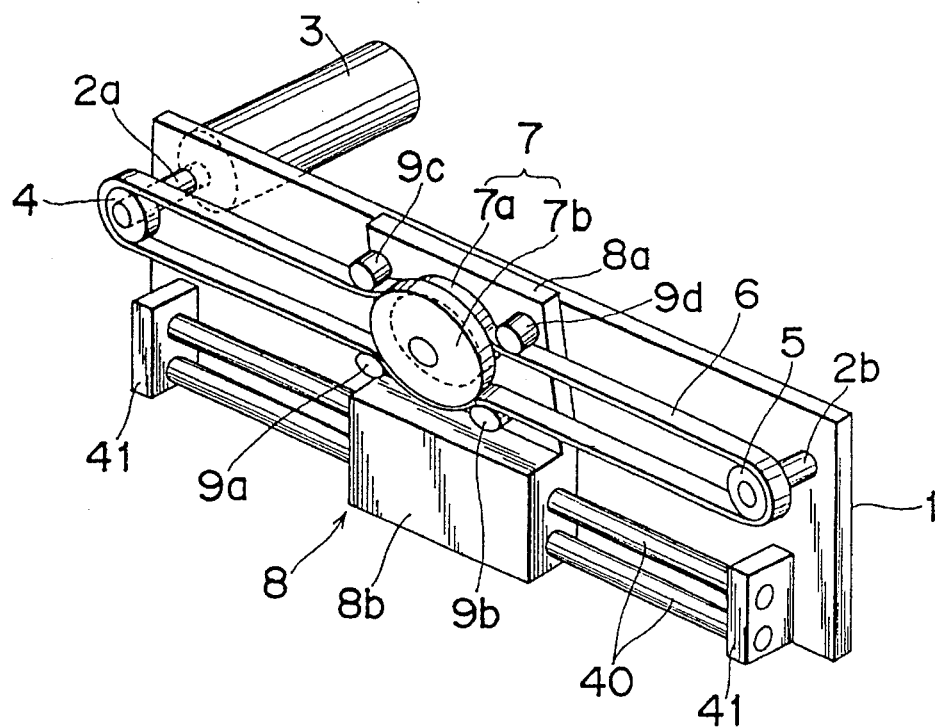
FIG. 1 is a schematic perspective view of a basic arrangement of a rectilinear motion apparatus in a first embodiment of the present invention.

Before the description of the present invention proceeds, it is to be noted that like parts are designated by like reference numerals throughout the accompanying drawings.

Preferred embodiments of the present invention will be discussed in detail with reference to the drawings.

Figure 2:
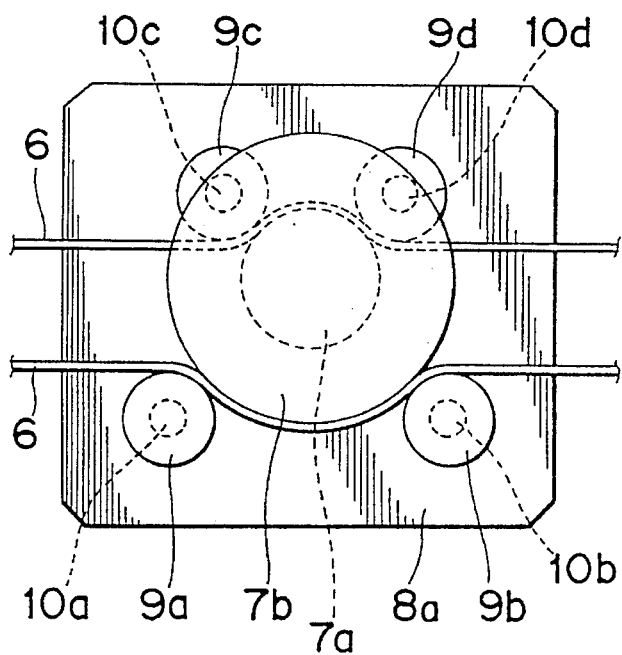
FIG. 2 is a front view of a part of the rectilinear motion apparatus of FIG. 1.
Figure 3:
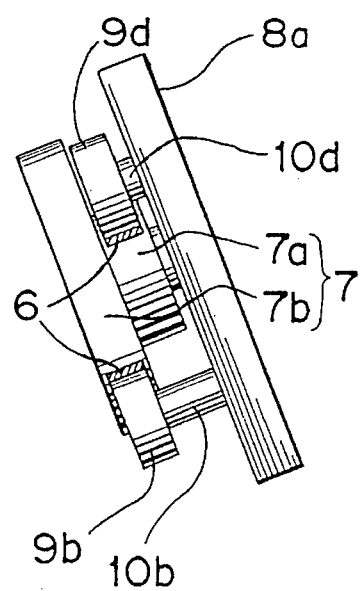
FIG. 3 is a side view of the apparatus in FIG. 2.

FIGS. 1 through 5 show a first embodiment of the present invention, and FIGS. 1–3 show a basic arrangement of the apparatus of the first embodiment. Firstly, the basic arrangement is described below.

Figure 9:
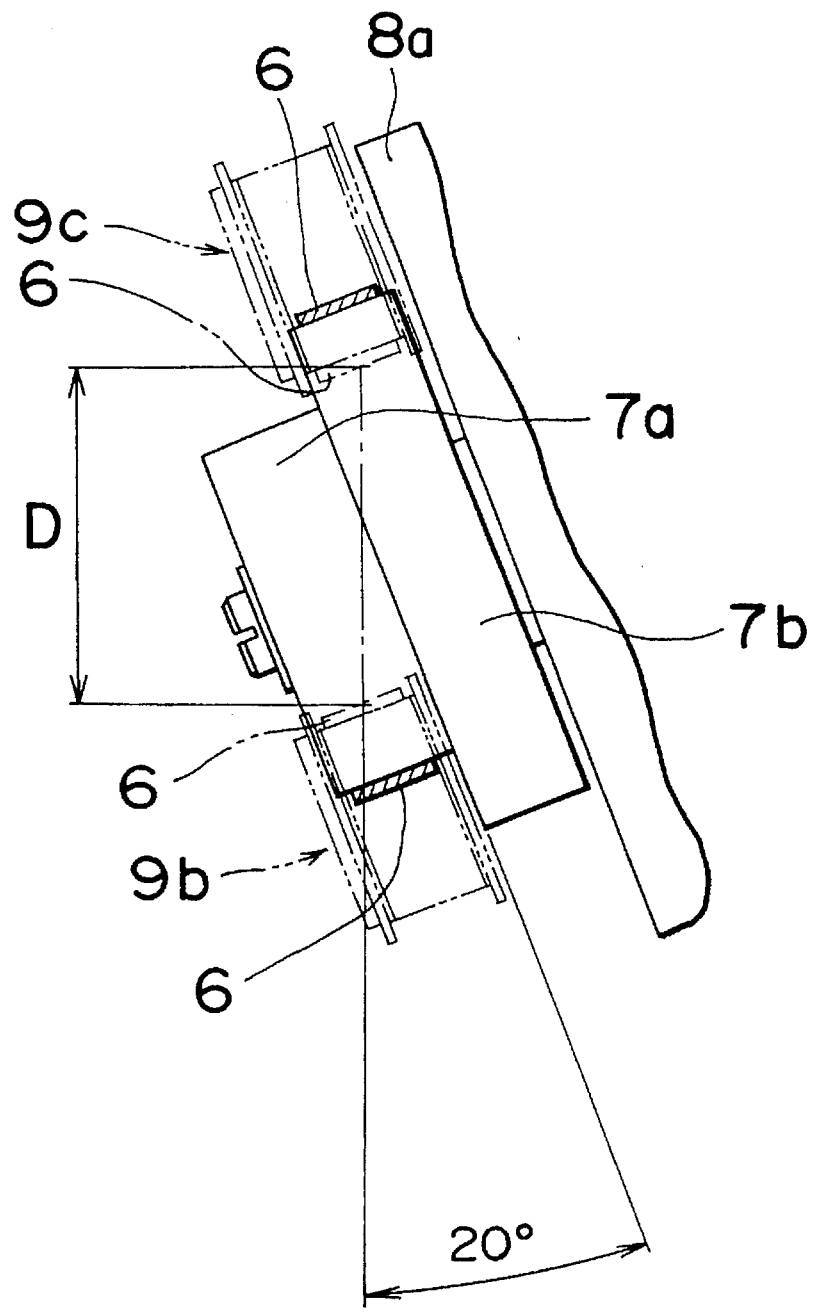
FIG. 9 is an enlarged view showing the relationship between moving pulleys and the belt in the apparatus of FIG. 7.

Referring to FIG. 1, shafts 2a, 2b are set parallel to each other. A driving motor 3 and a driving pulley 4 are coupled with each other by the shaft 2a. The shaft 2b is coupled with an idler pulley 5 in a manner to allow the rotation of the idler pulley 5. The shaft 2a rotatably penetrates through a base plate 1 and the shaft 2b is fixed to the plate 1. In the middle of an endless belt 6 supported between the driving pulley 4 and the idler pulley 5 are provided moving pulleys 7a, 7b of different diameters which have a common rotary axis. The pulleys 7a, 7b are formed in one unit 7 and are kept in touch with the endless belt 6. A thin part 8a of a slider 8 is inclined relative to the plane defined by the endless belt 6, that is, the rotary plane of the driving pulley 4 and the idler pulley 5 so as to accommodate the first and second halves of the course of the backward and forward movement of the endless belt 6 (i.e. the upper and lower runs of the endless belt 6) within the same plane. That is, the rotary axis of the moving pulleys 7a and 7b is inclined relative to the rotary axes of the driving pulley 4 and the idler pulley 5 by a predetermined angle such as 20 degrees as shown in FIG. 9. The endless belt 6 is held by first guide rollers 9a, 9b along a part of the peripheral portion of the moving pulley 7b in the lower (or first) run of the belt 6. Meanwhile, the endless belt 6 is held by guide rollers 9c, 9d along a part of the peripheral portion of the moving pulley 7a in the upper (or second) run of the belt 6. The moving pulley 7a is smaller in diameter than the moving pulley 7b.

The slider 8 has the thin part 8a and a thick part 8b integrally formed. The moving pulleys 7a and 7b, and the guide rollers 9a, 9b, 9c, and 9d are mounted on the thin part 8a. The thick part 8b of the slider 8 is rectilinearly and reciprocally guided by two rectilinear guide rods 40 of which both ends are fixed to the plate 1 via brackets 41. Such rectilinear guide means can be replaced with any rectilinear guide means in the prior art.

As shown in FIG. 9, the guide rollers 9a and 9b are arranged on the slider 8 so as to allow the belt 6 to partially move along the peripheral portion of the moving pulley 7b. The guide rollers 9c and 9d are arranged on the slider 8 so as to allow the belt 6 to partially move along the peripheral portion of the moving pulley 7a.

In FIG. 9, the distance D between the center positions of the sections of the belt 6 in the first and second runs of the belt brought in contact with the guide rollers 9a and 9c, or 9b and 9d is approximately equal to the diameter of the driving pulley 4 or the diameter of the idler pulley 5. The driving pulley 4 has the same diameter as the idler pulley 5.

As shown in FIG. 9, each of the guide rollers 9a, 9b, 9c, and 9d has flanges at both ends to prevent the belt 6 from slipping from the rollers.

The operation of the rectilinear moving apparatus in the above-described structure will be described with reference to FIG. 1.

When the driving motor 3 is driven, the driving pulley 4 the idler pulley 5 and the moving pulleys 7a, 7b coupled by the endless belt 6 are simultaneously rotated. Since the moving pulleys 7a, 7b are formed integrally although the diameters are different, the slider 8 is moved in the horizontal direction due to the difference of the moving amounts of the endless belt 6 on the circumferences of the moving pulleys 7a, 7b. If the ratio of the diameters of the moving pulleys 7a, 7b is changed, it is possible to change the moving amount of the slider 8 relative to the rotating amount of the driving motor 3.

The ratio of the moving amounts of the endless belt 6 and the slider 8 in the present embodiment will be represented by an equation (1) below:

$$u=(r2-r1)v/(r1+r2) \tag{1}$$

The ratio expressed as above will be further described with reference to FIG. 10.

Figure 10:
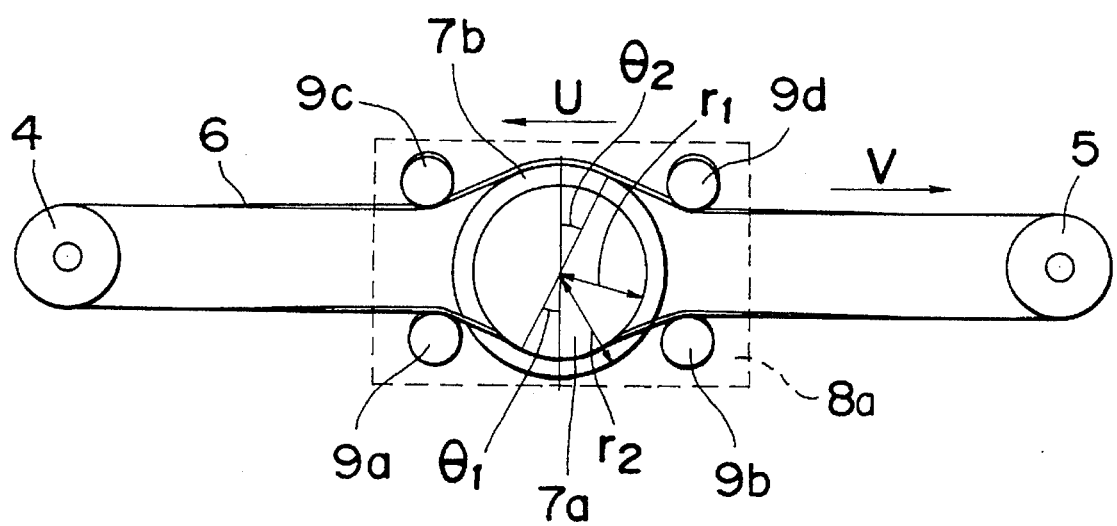
FIG. 10 is a diagram explanatory of the ratio of the moving amount between an endless belt and a slider in the rectilinear moving apparatus of FIG. 1.
Figure 11:
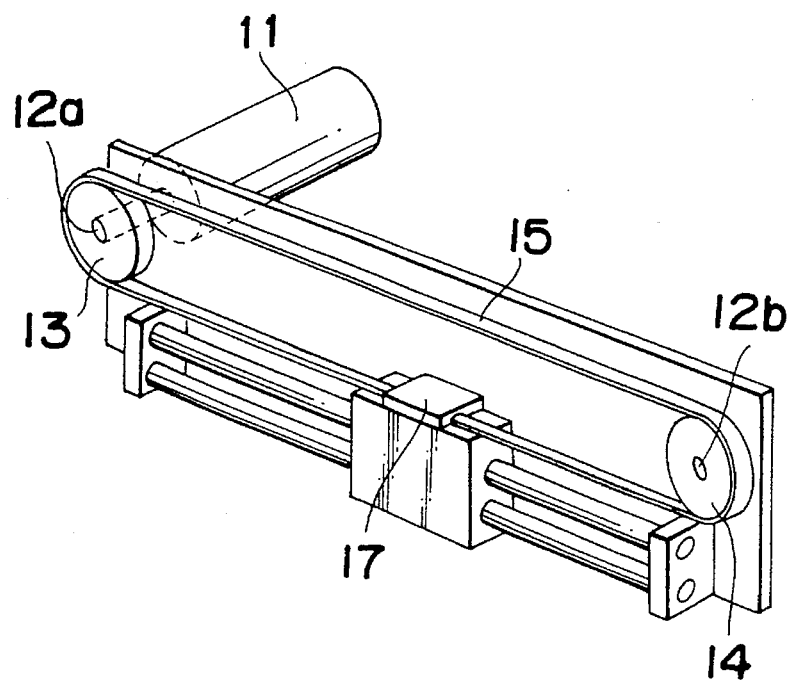
FIG. 11 is a structural diagram of a conventional rectilinear moving apparatus without a reduction function.
Figure 12:
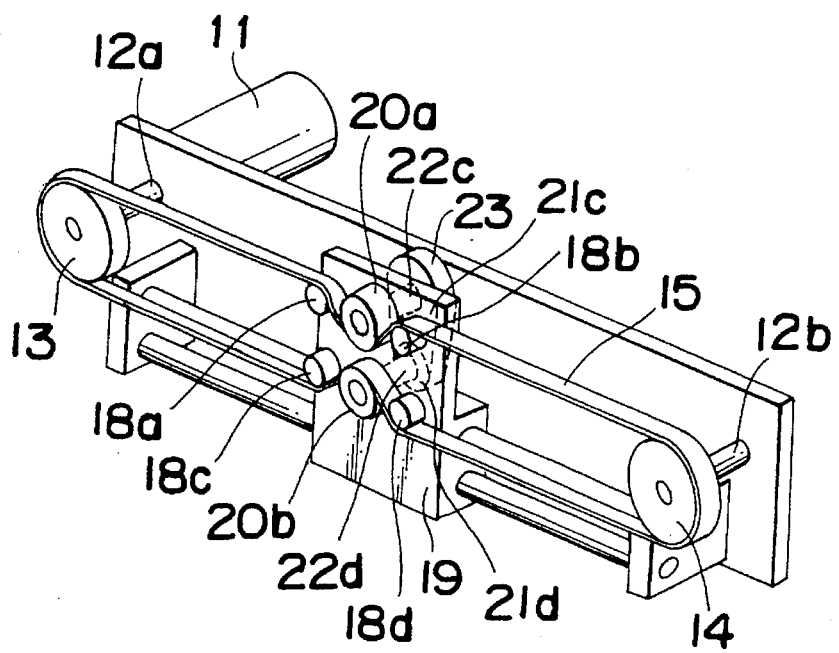
FIG. 12 is a structural diagram of a conventional rectilinear moving apparatus with a reduction function.

In FIG. 10, reference characters indicate respectively:

v the moving amount of the endless belt 6; u the moving amount of the slider 8; θ1, θ2 the rotating angles of the moving pulleys 7a, 7b; and r1, r2 the radii of the moving pulleys 7a, 7b.

The ratio of the moving amounts of the endless belt 6 and the slider 8 achieved in the constitution of the above rectilinear moving apparatus will be described hereinbelow. The rotating angles θ1, θ2 can be represented by equations (2) and (3) with the use of v, u, r1, and r2, respectively:

$$\theta 1=(v-u)/r1 \tag{2}$$

$$\theta 2=(v+u)/r2 \tag{3}$$

Since the moving pulleys 7a, 7b are constructed in one unit, an equation (4) will be held:

$$\theta 1=\theta 2 \tag{4}$$

The above equation (1) is obtained from the equations (2), (3), and (4).

In the basic arrangement of the first embodiment, the endless belt 6 is held along the moving pulley 7b in the first run and along the moving pulley 7a in the second run of the belt 6. However, the reverse can be employed, i.e., the endless belt 6 can be wound along the moving pulley 7a in the first run and along the moving pulley 7b in the second run. Moreover, the endless belt 6 can be an endless toothed belt.

As has been described hereinabove, according to the basic arrangement of the first embodiment, the moving pulleys of different diameters are integrally formed, and the endless belt is held in touch with one of the moving pulleys and the other of the moving pulleys in the first run and in the second run of the belt. Therefore, the rectilinear moving apparatus of the present embodiment becomes simple in structure and inexpensive, while achieving a high gear reduction, augmenting the thrust, improving the positional accuracy and reducing the loss of movement. Moreover, if the ratio of the diameters of the moving pulleys is changed, it becomes possible to change the moving amount of the slider relative to the rotating amount of the driving motor.

In the embodiment, an endless toothed belt can be used as one example of the endless belt 6.

As is understood from FIGS. 1, 2, 3, and 4, the rectilinear motion apparatus of the first embodiment is characteristic of the arrangement that the pulley 7a of a smaller diameter is disposed in proximity to the slider 8, and the pulley 7b of a larger diameter is set outside the smaller pulley 7a away from the slider 8. The pulleys 7a and 7b can be integrally connected with each other or can be integrally formed as one component.

Figure 4:
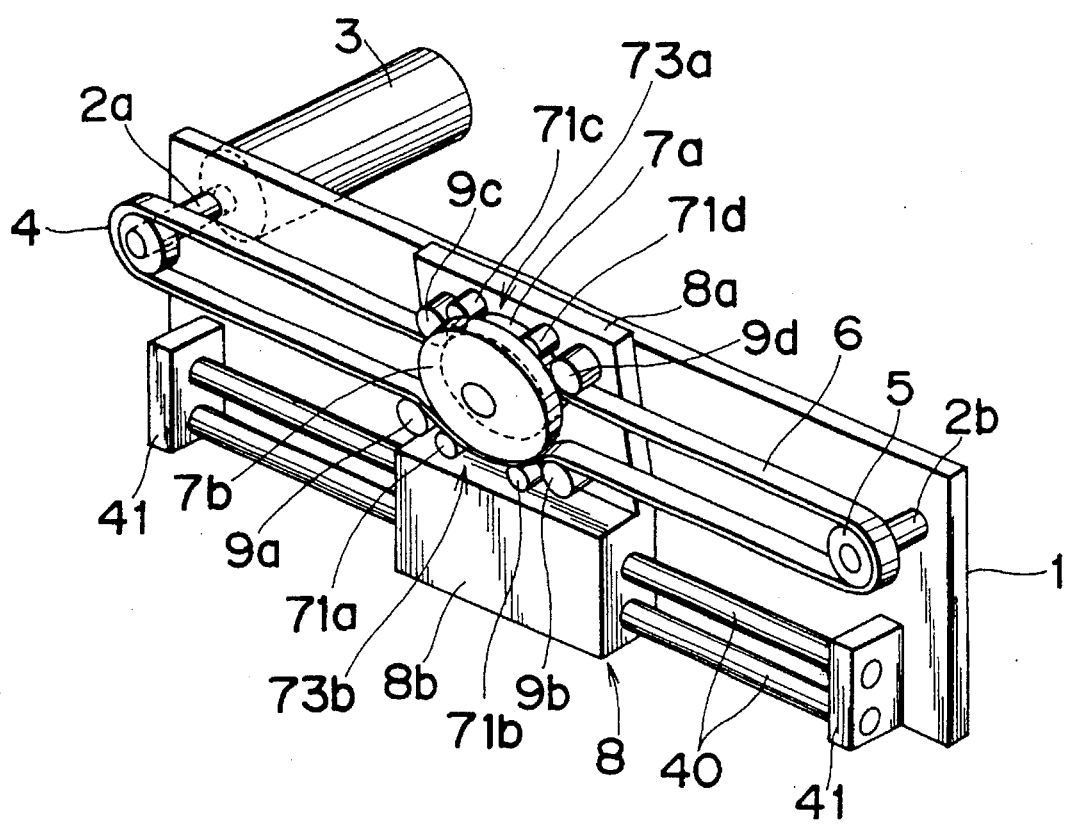
FIG. 4 is a perspective view of the rectilinear motion apparatus in the first embodiment of the present invention.

As shown in FIG. 4, the great characteristic of the first embodiment is the provision of regulating rollers described below.

Figure 5A:
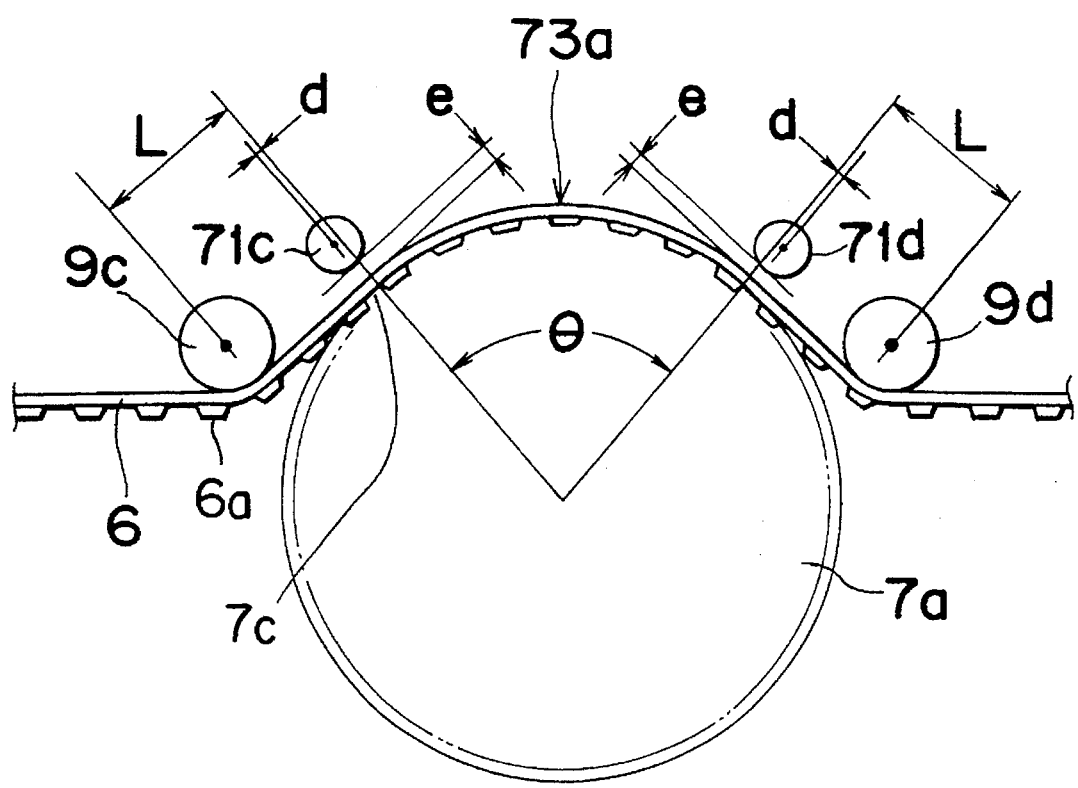
FIGS. 5A and 5B are detailed front views of a part where a toothed belt is meshed with a moving pulley in the first embodiment of FIG. 4.
Figure 5B:
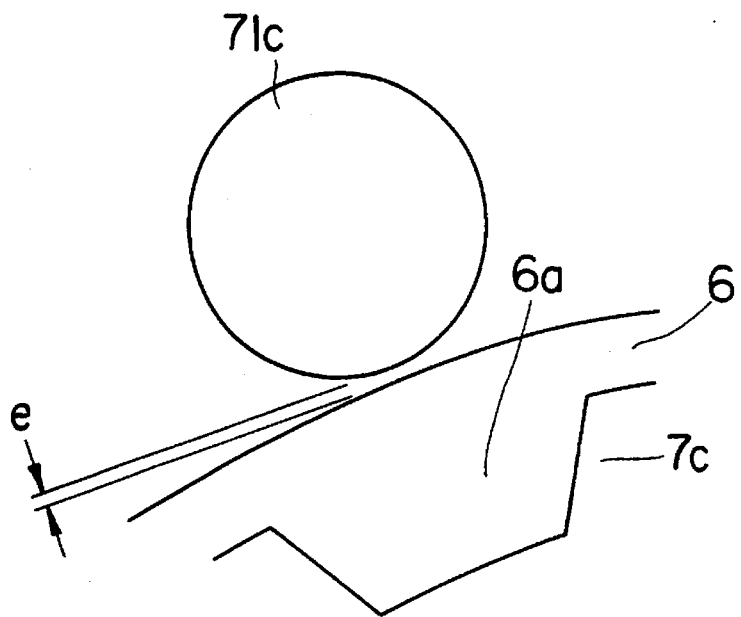

As is clearly shown in FIG. 5A, in the basic arrangement of the first embodiment of the invention, the rotary center of each of guide rollers 9a–9d is separated a suitable distance L, respectively, from the end of each of engaging parts 73a, 73b of the moving pulleys 7a, 7b with the toothed belt 6. The distance L is defined in order to securely engage the moving pulleys 7a and 7b with the straight portion of the belt 6 after the belt 6 is bent by the guide roller. If the moving pulleys 7a and 7b that engage do not engage with the straight portion of the belt 6, the moving pulleys 7a and 7b may interfere with the belt 6. Therefore, the distance L is preferably at least two circular pitches, where one circular pitch is a distance between two adjacent teeth.

Each of the engaging parts 73a, 73b is a peripheral portion corresponding to a winding angle θ of around each of the moving pulleys 7a and 7b. The engaging parts 73a, 73b are alternatively referred to as first and second predetermined arc engagement portions. The winding angle θ is preferably within 30° through 60° and, most preferably, 50°.

Moreover, regulating rollers 71a, 71b, 71c, and 71d are so arranged that the rotary center of each of the regulating rollers 71a–71d is arranged a minute distance d outside the engaging parts 73a, 73b to regulate the shift of the toothed belt 6 in a disengaging direction away from the moving pulley 7a or 7b in which the toothed belt 6 disengages from the moving pulley 7a or 7b. The belt 6 is strongly pulled by a tension F in the circular direction of the pulley just before the missing of the engagement of the moving pulleys 7a and 7b and the belt 6. Therefore, a tooth 6a of the belt 6 is deformed and thus the interference between the teeth 6a, 7c of the belt 6 and the pulley 7a or 7b is caused before a geometrical contact point, so that the tooth 6a of the belt 6 does not engage with the tooth 7c of the pulley 7a or 7b until the bottoms of the teeth 6a, 7c of the belt 6 and the pulley 7a or 7b are engaged with each other and then the missing of the engagement is caused. In order to remove such a disadvantage, the tooth of the belt 6 is pressed into the teeth of the pulley 7a or 7b by the regulating roller to effectively prevent the missing of the engagement. If the minute distance d is too large, the tooth of the belt 6 can not engage with the tooth of the pulley sufficiently. So, the minute distance d is about 0–0.5 times the circular pitch preferably.

Each of the regulating rollers 71a–71d is spaced by a minute gap e from the toothed belt 6. The minute gap e is made as small as possible so that there will not normally be contact between the regulating roller and the belt. If the regulating roller was to normally contact the belt 6, the efficiency would be reduced due to the rotary friction of the roller and an expensive bearing might be necessary because the rotation number of the roller is equal to 15,000 rpm or more. If the minute gap e is made too large, the effect of pressing the tooth of the belt 6 between the teeth of the pulley 7a or 7b is deteriorated. Thus, the minute gap e is 0.1–0.2 times the tooth height of the belt 6, preferably (see FIG. 5B.

In the above-described constitution, the slider 8 is moved by the driving motor 3 as discussed above. Since the slider 8 is moved less than the moving amount of the toothed belt 6, the moving amount of the slider 8 per rotation is reduced even when the driving motor 3 is directly coupled to the driving pulley 4. Accordingly, the apparatus realizes rectilinear motion with a high thrust high accuracy.

Since the guide rollers 9a–9d, in order to secure the winding angle θ of the toothed belt 6 about the moving pulleys 7a, 7b, are separated the suitable distance L at both sides of the engaging parts 73a, 73b, the guide rollers 9a–9d do not greatly bend the toothed belt 6 at the rear side when the toothed belt 6 starts to mesh with the moving pulleys 7a, 7b. In consequence, the toothed belt 6 is enabled to smoothly mesh with the moving pulleys 7a, 7b without any problem. In other words, if the guide rollers 9a–9d were disposed directly at both ends of the engaging parts 73a, 73b and were not separated from the engaging parts 73a, 73b for the purpose of avoiding missing of the engagement at the engaging parts between the toothed belt 6 and the moving pulleys 7a, 7b, the toothed belt 6 would be bent at the rear side by the guide rollers 9a–9d with a small radius of curvature, which would result in the defective engagement of the toothed belt 6 with the moving pulleys 7a, 7b. If the thrust is large in the above state, the engagement failure is spread and accumulated in the process of the engagement of the toothed belt 6 with the moving pulleys 7a, 7b, whereby the engagement would eventually be lost.

According to the first embodiment, the toothed belt 6 is regulated so as not to shift in the disengaging direction by the regulating rollers 71a–71d set in the vicinity of both ends of the engaging parts 73a, 73b while the toothed belt 6 is securely kept in the properly engaged state. Therefore, the toothed belt 6 is allowed to smoothly mesh with the moving pulleys 7a, 7b, thereby obtaining a high thrust. Particularly, it is most effective when the regulating rollers 71a–71d are arranged the minute distance d outside the engaging parts 73a, 73b.

Moreover, when the minute gap e is secured between each of the regulating rollers 71a–71d and the toothed belt 6, the regulating rollers 71a–71d are normally prevented from rotating (i.e. are prevented from being rotated by normally engaged state in which the toothed belt 6 normally engages with the pulleys 7a and 7b). Therefore bearing parts of the regulating rollers 71a–71d are prevented from being burnt even if the toothed belt 6 is moved at high speeds. Accordingly, inexpensive rollers of a simple structure may be employed as the regulating rollers 71a–71d.

According to the first embodiment of the present invention, since the smaller pulley 7a of a moving pulley unit 7 is set at the side where the moving pulley unit 7 is fixed, guide rollers 9c and 9d for the smaller pulley 7a can be made small in diameter, so that the manufacturing cost of the apparatus is reduced. Moreover, the contact angle of the moving pulley unit 7 and the endless belt 6 is sufficient to suppress slippage of the endless belt 6.

As is clear from the foregoing description of the invention, the smaller diameter pulley of the moving pulley is disposed at the side closer to the slider, while the larger diameter pulley of the moving pulley unit which is integrally connected coaxially with the smaller pulley is arranged outside the smaller pulley. Accordingly, the rectilinear motion apparatus achieves smooth rectilinear motion with the guide rollers being made smaller in diameter and the endless belt being inhibited from slipping. In the constitution described above, since the guide rollers are prevented from interfering with the larger pulley, the diameter of the guide rollers can be made small independently of the diameter of the moving pulley, so that the contact angle between the moving pulley and the endless belt can be increased.

Figure 13B:
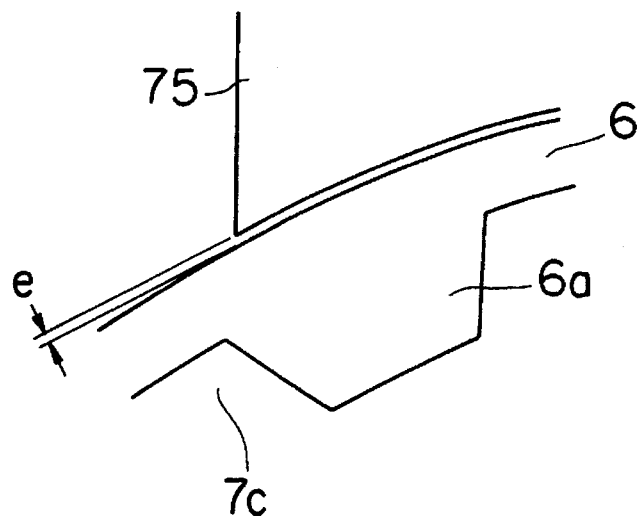
FIGS. 13A and 13B are views similar to FIGS. 5A and 5B but showing the embodiment of FIG. 6.
Figure 6:
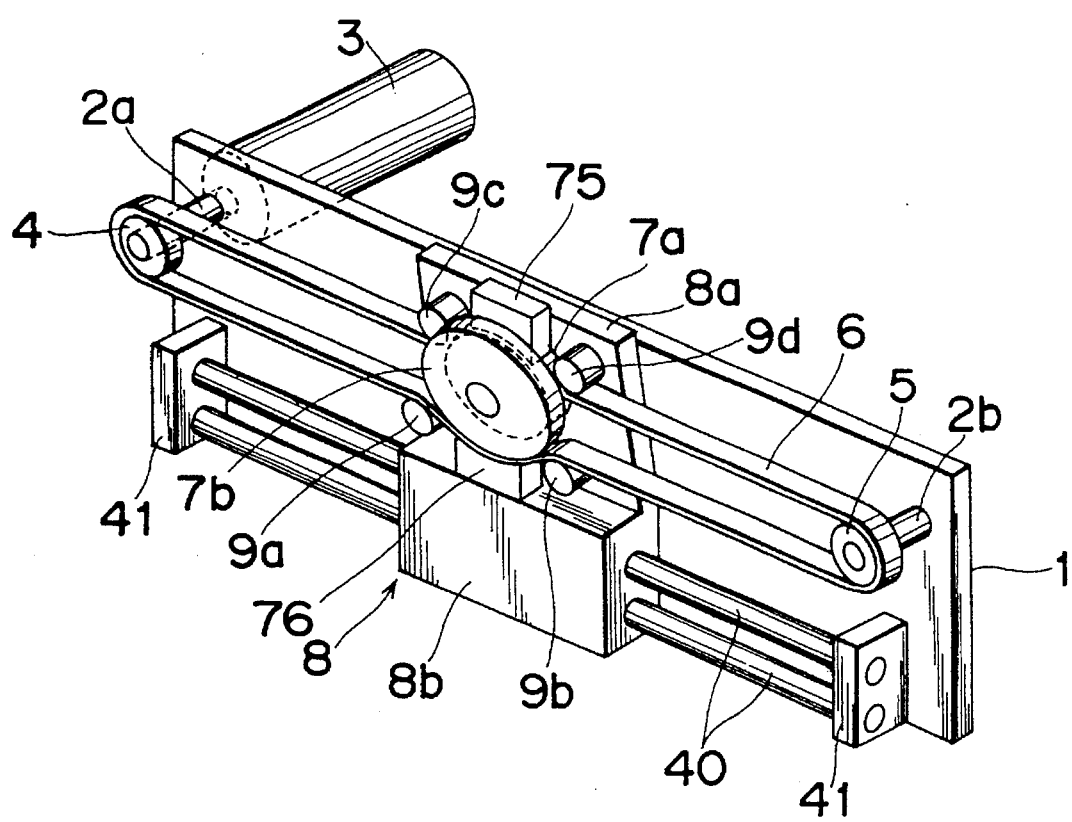
FIG. 6 is a perspective view of a rectilinear motion apparatus in a second embodiment of the present invention.
Figure 13A:
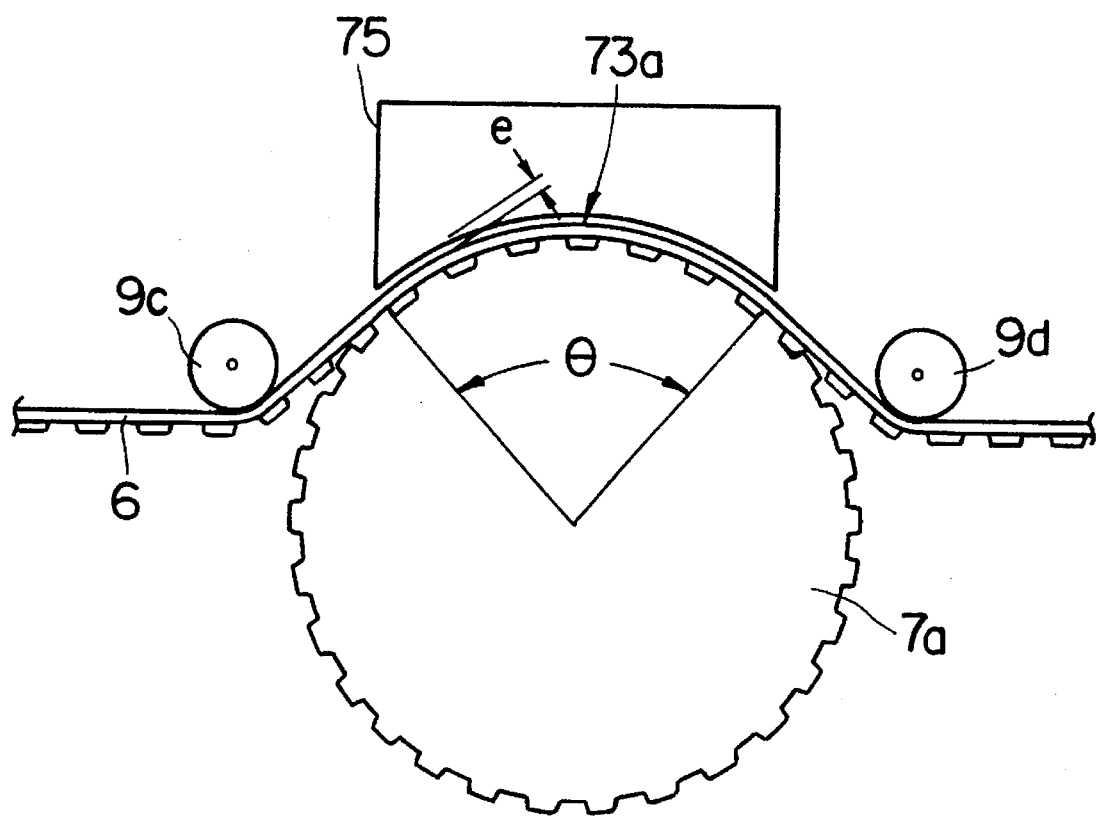

A second embodiment of the present invention will be described with reference to FIGS. 6, 13A and 13B. In the second embodiment of FIG. 6, regulating blocks 76, 75 are installed between the guide rollers 9a and 9b and between the guide rollers 9c and 9d in the outer periphery of the engaging parts 73a, 73b of the toothed belt 6 and the moving pulleys 7a, 7b, respectively. The regulating blocks 75, 76, in place of the foregoing regulating rollers 71a–71d, regulate the shift of the toothed belt 6 in the disengaging direction. Each of the regulating blocks 75 and 76 has a curved surface corresponding to an outer curved surface of the confronting moving pulley 7a, 7b and which is separated by a minute gap e from the toothed belt 6 engaging with the corresponding pulleys 7a or 7b (see FIGS. 13A and 13B).

Although the same effect as with the regulating rollers 71a–71d is achieved in the above second embodiment, the second embodiment is suitably applicable to a case where the toothed belt 6 is moved at relatively low speeds because the frictional resistance is large if the toothed belt 6 is in touch with the regulating blocks 75, 76.

Third and fourth embodiments of the present invention will be discussed hereinbelow with reference to FIGS. 7 and 8.

It is to be noted here that the description of the driving motor 3, shafts 2a, 2b, driving pulley 4, driven or idler pulley 5, toothed belt 6, moving pulleys 7a, 7b, slider 8 and guide rollers 9a–9d in the first and second embodiments depicted with reference to FIGS. 1–6 will be applied to the same component parts of the third and fourth embodiments, and therefore these parts of the third and fourth embodiments will not be described in detail below.

Figure 7:
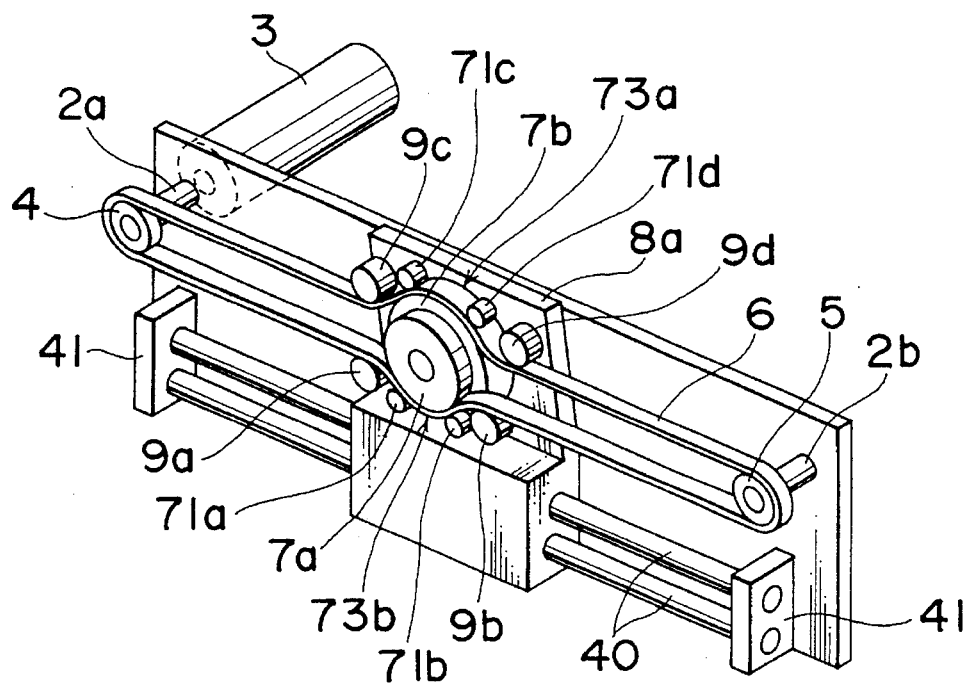
FIG. 7 is a perspective view of the rectilinear motion apparatus in a third embodiment of the present invention.
Figure 8:
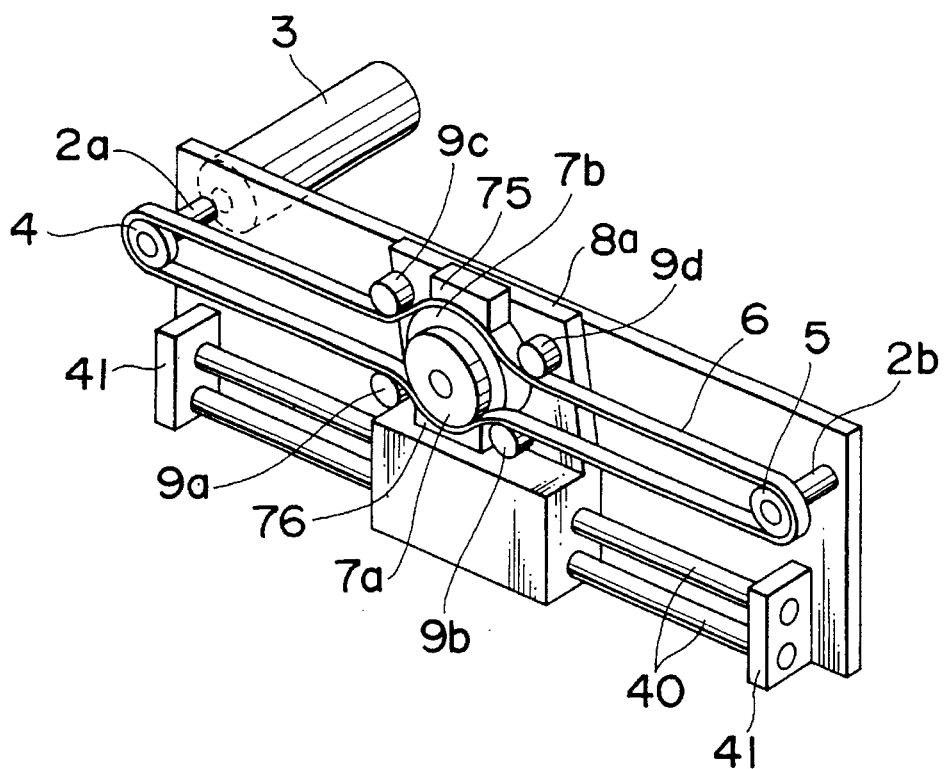
FIG. 8 is a perspective view of a rectilinear motion apparatus in a fourth embodiment of the present invention.

As is understood from FIGS. 7 and 8, rectilinear motion apparatuses of the third and fourth embodiments have the characteristic that the larger diameter pulley 7b is disposed in proximity to the slider 8, and the smaller diameter pulley 7a is set outside the larger pulley 7b away from the slider 8.

The third embodiment has the regulating rollers 71a–71d corresponding to the first embodiment. The effect caused by the regulating rollers 71a–71d is the same as that of the first embodiment.

The fourth embodiment has the regulating blocks 75 and 76 corresponding to the second embodiment. The effect caused by the regulating blocks 75 and 76 is the same as that of the second embodiment.

As described hereinabove, according to the rectilinear motion apparatus of the first through fourth embodiments, the regulating means arranged in the vicinity of the engaging parts of the toothed belt and the moving pulleys regulate the shift of the toothed belt in the disengaging direction, so that the toothed belt smoothly meshes with the moving pulleys, and missing of the engagement is avoided. Accordingly, a high thrust is obtained.

Besides, each of the guide rollers securing the winding angle of the toothed belt is separated a suitable distance from each end of the engaging parts of the toothed belt and the moving pulleys, and the toothed belt is not greatly bent by the guide rollers at a position where the toothed belt starts to be engaged with the moving pulley, and therefore the toothed belt smoothly meshes with the moving pulleys. Since the regulating rollers in the vicinity of both ends of the engaging parts regulate the toothed belt so as not to shift in the disengaging direction in the above smoothly meshed state, the teeth of the toothed belt are ensured to smoothly slide into between the teeth of the moving pulleys. Accordingly, a high thrust is obtained without missing of engagement between the toothed belt and moving pulleys. Because of a minute gap between each of the regulating rollers and the toothed belt, the regulating rollers are prevented from rotating in the normally engaged state of the belt 6 with the moving pulleys, and consequently burning of the bearing parts of the regulating rollers are prevented even when the toothed belt is moved at high speeds.

A similar effect is achieved when the regulating blocks are provided between the guide rollers in place of the regulating rollers and with a minute gap normally maintained between the guide rollers and the toothed belt. It is suitable, however, to employ the arrangement in a case where the moving speed of the toothed belt is relatively small because of the large frictional resistance when the regulating blocks come in touch with the toothed belt.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

We claim:

1. A rectilinear motion apparatus comprising:

a base plate;

two shafts mounted to said base plate and arranged parallel to one another;

a driving motor and a driving pulley coupled to one of said two shafts;

an idler pulley coupled to the other of said two shafts;

an endless toothed belt mounted about and extending between said driving pulley and said idler pulley;

a slider disposed between said driving pulley and said idler pulley;

first and second toothed moving pulleys mounted to said slider and being integrally fixed to one another for simultaneous rotation about a single axis, said first moving pulley having a smaller diameter than said second moving pulley;

a pair of first guide rollers mounted on said slider adjacent said first moving pulley and being in contact with a first run of said endless belt to cause said first run of said endless belt to normally be meshed with said first moving pulley over a first predetermined arc engagement portion;

a pair of second guide rollers mounted on said slider adjacent said second moving pulley and being in contact with a second run of said endless belt to cause said second run of said endless belt to normally be meshed with said second moving pulley over a second predetermined arc engagement portion;

a pair of first regulating rollers rotatably mounted to said slider at respective positions adjacent opposite ends of said first predetermined arc engagement portion for regulating shifting of said first run of said endless belt in a disengaging direction away from said first moving pulley; and a pair of second regulating rollers rotatably mounted to said slider at respective positions adjacent opposite ends of said second predetermined arc engagement portion for regulating shifting of said second run of said endless belt in a disengaging direction away from said second moving pulley.

2. A rectilinear motion apparatus as recited in claim 1, wherein said first guide rollers are spaced outwardly a first predetermined distance from said opposite ends of said first predetermined arc engagement portion, respectively; and said second guide rollers are spaced outwardly a second predetermined distance from said opposite ends of said second predetermined arc engagement portion, respectively.

3. A rectilinear motion apparatus as recited in claim 2, wherein each of said first and second predetermined distances is at least twice the pitch between teeth of said endless belt.

4. A rectilinear motion apparatus as recited in claim 1, wherein said first regulating rollers have rotational axes respectively positioned minute distances outwardly of radial lines passing from said axis of said first and second moving pulleys through said opposite ends of said first predetermined arc engagement portion; and said second regulating rollers have rotational axes respectively positioned minute distances outwardly of radial lines passing from said axis of said first and second moving pulleys through said opposite ends of said second predetermined arc engagement portion.

5. A rectilinear motion apparatus as recited in claim 4, wherein each of said minute distances is less than about 0.5 times the pitch between teeth of said endless belt.

6. A rectilinear motion apparatus as recited in claim 1, wherein a minute gap is formed between each of said first regulating rollers and said first run of said endless belt when the teeth of said first run of said belt are correctly enmeshed with the teeth of said first moving pulley along said first predetermined arc engagement portion; and a minute gap is formed between each of said second regulating rollers and said second run of said endless belt when the teeth of said second run of said belt are correctly enmeshed with the teeth of said second moving pulley along said second predetermined arc engagement portion.

7. A rectilinear motion apparatus as recited in claim 6, wherein each of said minute gaps is in a range of 0.1–0.2 times the height of the teeth of said endless belt.

8. A rectilinear motion apparatus as recited in claim 7, wherein said first moving pulley is mounted adjacent said slider and between said slider and said second moving pulley.

9. A rectilinear motion apparatus as recited in claim 7, wherein said second moving pulley is mounted adjacent said slider and between said slider and said first moving pulley.

10. A rectilinear motion apparatus as recited in claim 1, wherein said first moving pulley is mounted adjacent said slider and between said slider and said second moving pulley.

11. A rectilinear motion apparatus as recited in claim 1, wherein said second moving pulley is mounted adjacent said slider and between said slider and said first moving pulley.

12. A rectilinear motion apparatus comprising:

a base plate;

two shafts mounted to said base plate and arranged parallel to one another;

a driving motor and a driving pulley coupled to one of said two shafts;

an idler pulley coupled to the other of said two shafts;

an endless toothed belt mounted about and extending between said driving pulley and said idler pulley;

a slider disposed between said driving pulley and said idler pulley;

first and second toothed moving pulleys mounted to said slider and being integrally fixed to one another for simultaneous rotation about a single axis, said first moving pulley having a smaller diameter than said second moving pulley;

a pair of first guide rollers mounted on said slider adjacent said first moving pulley and being in contact with a first run of said endless belt to cause said first run of said endless belt to normally be meshed with said first moving pulley over a first predetermined arc engagement portion;

a pair of second guide rollers mounted on said slider adjacent said second moving pulley and being in contact with a second run of said endless belt to cause said second run of said endless belt to normally be meshed with said second moving pulley over a second predetermined arc engagement portion;

a first regulating block mounted to said slider at a position adjacent said first predetermined arc engagement portion and having a curved surface which is complementary in shape to said first predetermined arc engagement portion and confronts said first run of said belt for regulating shifting of said first run of said endless belt in a disengaging direction away from said first moving pulley; and a second regulating block mounted to said slider at a position adjacent said second predetermined arc engagement portion and having a curved surface which is complementary in shape to said second predetermined arc engagement portion and confronts said second run of said belt for regulating shifting of said second run of said endless belt in a disengaging direction away from said second moving pulley.

13. A rectilinear motion apparatus as recited in claim 12, wherein a minute gap is formed between said first regulating block and said first run of said endless belt when the teeth of said first run of said belt are correctly enmeshed with the teeth of said first moving pulley along said first predetermined arc engagement portion; and a minute gap is formed between said second regulating block and said second run of said endless belt when the teeth of said second run of said belt are correctly enmeshed with the teeth of said second moving pulley along said second predetermined arc engagement portion.

14. A rectilinear motion apparatus as recited in claim 13, wherein each of said minute gaps is in a range of 0.1–0.2 times the height of the teeth of said endless belt.

15. A rectilinear motion apparatus as recited in claim 14, wherein said first moving pulley is mounted adjacent said slider and between said slider and said second moving pulley.

16. A rectilinear motion apparatus as recited in claim 14, wherein said second moving pulley is mounted adjacent said slider and between said slider and said first moving pulley.

17. A rectilinear motion apparatus as recited in claim 12, wherein said first moving pulley is mounted adjacent said slider and between said slider and said second moving pulley.

18. A rectilinear motion apparatus as recited in claim 12, wherein said second moving pulley is mounted adjacent said slider and between said slider and said first moving pulley.

* * * * *